Oct. 19, 1971  H. J. WEHREN  3,613,289
SPINNING BOBBER
Filed Sept. 15, 1969
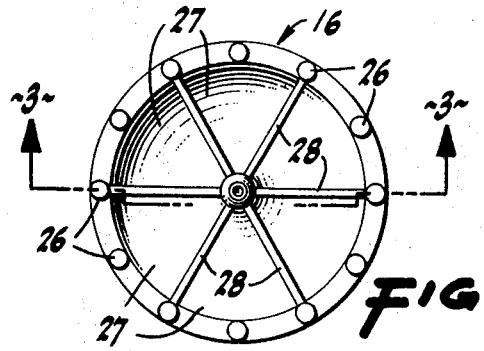
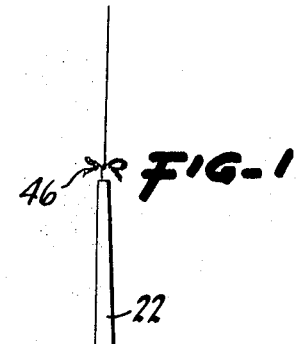
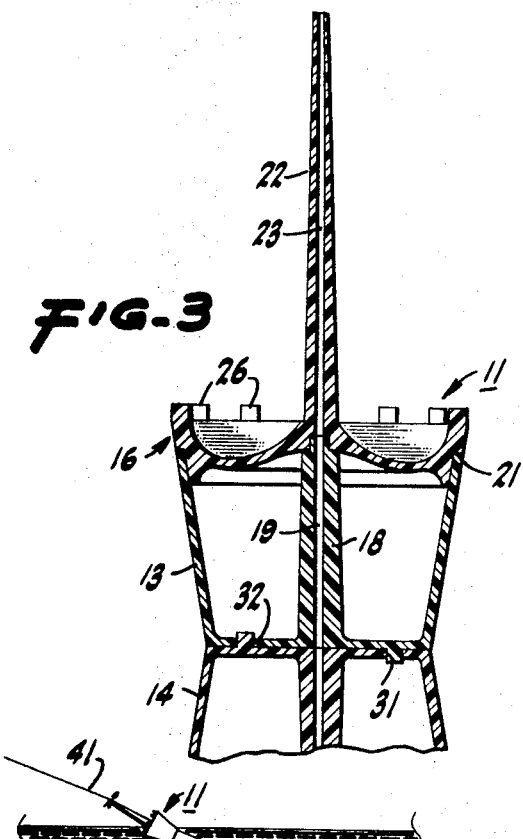
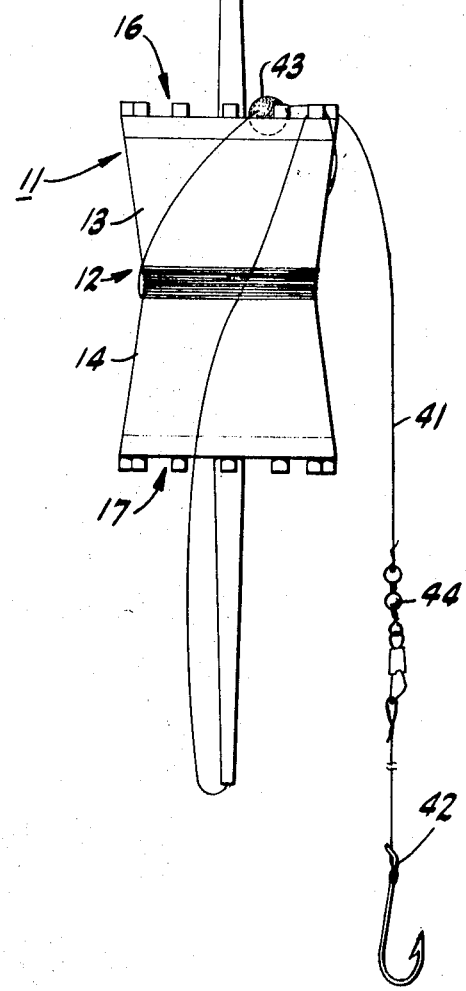
INVENTOR
HAROLD J. WEHREN
By Gregg & Henderson
ATTORNEYS

United States Patent Office 3,613,289
Patented Oct. 19, 1971

3,613,289
SPINNING BOBBER
Harold J. Wehren, Rte. 1, Box 315,
Eagle, Idaho 83616
Filed Sept. 15, 1969, Ser. No. 857,864
Int. Cl. A01k 93/00
U.S. Cl. 43—43.11               4 Claims

ABSTRACT OF THE DISCLOSURE

A buoyant element or a bobber through which fishing line is threaded and about which such line is wound to a length equal to a desired depth in water of ultimate fishhook location. End projections and pockets are provided for the looping of line thereabout and removable retention of a sinker weight, respectively.

BACKGROUND OF INVENTION

In the field of angling or fishing it is known to employ floats or bobbers on fishline to maintain some desired portion of the line at the surface of the water. It is in fact quite conventional in commercial fishing to employ a plurality of spaced floats on fishing line. In the field of angling in which casting is employed, it is somewhat more difficult to employ floats or bobbers for they tend to interfere with the casting operation. It is however recognized that in many instances it is desirable to locate the fishhook and bait at some predetermined distance below the surface of water being fished.

Previously the use of a bobber has been limited in that the bobber could only be "cast" by a pendulous action. Thus a long pole has been employed to cast a bobber about twice the pole length by pendulum action. Referring further to casting, it is known to employ spinning gear by means of which a line unwinds from a reel during the cast so that the hook and weight may be projected a substantial distance. A weight at or near the end of the fishing line provides the momentum by means of which the line unreels as the pole is whipped. The bobber of the present invention is particularly adapted for casting employing spinning gear and thus provides for depth location of a fish hook in this type of casting. Thus the name "spinning bobber." Although it has been proposed to employ a float with a fishing line wound about a pair of pegs thereon, such is not wholly satisfactory for casting with spinning gear.

SUMMARY OF INVENTION

There is provided by the present invention a float, or bobber as it is commonly termed in angling, which is particularly adapted for casting with spinning gear. The bobber is formed somewhat as a solid of revolution, preferably with axially elongated ends and a central opening therethrough for the threading of fishing line therethrough. The central portion of the spinning bobber of this invention is provided as a pair of facing conical sections with a decreased diameter at the joinder thereof. About at least one end of the central section there is provided a plurality of axially-extending projections or pegs spaced about the circumference thereof and at the same end there are provided longitudinal indentations or pockets adapted to receive a sinker or weight commonly employed in casting.

With regard to utilization of the present invention it is contemplated that a fishing line shall be threaded through the central axial opening of the bobber and then returned to wrap once about a peg or projection at an end thereof and thence back for winding about the middle annular portion of the bobber to an extent substantially equal to the depth at which it is desired to have the fishhook depend. The end of the fishing line with the hook thereon is thence, after winding about the central annular portion of the bobber, extended back up around an end projection or peg with the weight or sinker disposed in an end depression or pocket and the hook hung over the side of the bobber. As a further part of utilizing the present invention there is normally employed a small piece of yarn or the like which is inserted through a knot tied in the fishing line at the entrance end of the axial opening through the bobber thereof.

In the use of the present invention the fishing line is wound as described above and it is then cast. As the hook and bobber alights upon the water the bobber will float because of the buoyancy thereof. The angler then, by jerking the line, may tip the bobber so that the weight or sinker falls from the pocket or recess in the end of the bobber. This will cause the weight to sink and unwind the line from the central portion of the bobber. As the weight sinks the hook attached to the line beyond the weight will sink and as the line becomes entirely unwound from the central portion of the bobber it will cease to sink as it is then carried directly by the buoyant bobber so that the fishhook is disposed at a predetermined distance below the surface of the water.

DESCRIPTION OF FIGURES

There is illustrated in the accompanying drawings a preferred embodiment of the present invention wherein:

FIG. 1 is a side elevational view of a spinning bobber in accordance with the present invention;

FIG. 2 is a top plan view of the bobber of FIG. 1;

FIG. 3 is a longitudinal sectional view taken on the plane 3—3 of FIG. 2; and

FIG. 4 is a schematic illustration of the spinning bobber of the present invention floating in the water with the fishing line unreeled therefrom.

DESCRIPTION OF PREFERRED EMBODIMENT

The spinning bobber of the present invention is generally illustrated as to a preferred embodiment thereof in FIGS. 1 to 3 and referring thereto it will be seen that the bobber 11 comprises a central body portion 12 including two truncated conical portions 13 and 14 joined together at the small diameter end of each portion. End portions 16 and 17 extend across the bases of the truncated conical portions 13 and 14, respectively. Each of the conical portions and each of the end portions may be identical, and referring now to the upper conical portion 13, it will be seen in FIG. 3 to be formed as a generally hollow element formed of plastic or the like and having a central core 18 defining an axial passage 19 therethrough. The end portion 16 fits upon the large or base end of the conical body portion 13, as illustrated in FIG. 3, and is formed of a lightweight rigid plastic, for example, having a shoulder 21 thereabout with a depending portion to thus slip-fit into the open end of the conical body portion 13. Additionally, the end portion 16 is formed with an elongated tapered axial extension 22 having a central passage 23 therethrough, again as illustrated in FIG. 3. This end portion 16 furthermore includes an axial internal indentation adapted to receive a small extension of the core 18 of the conical portion 13 so that the axial passageways 23 and 19 are aligned. It will thus be seen that there is provided a small axial passage entirely through the spinning bobber of the present invention.

In addition to the foregoing, the preferred embodiment of the present invention incorporates about the outer end of each of the conical body portions 13 and 14 axially-extending projections or pegs 26. These pegs 26 are disposed about the circumference of the end portion 16 and are directed axially of the bobber, as illustrated, for example, in FIGS. 1 and 3. Additionally, the end portion 16 is provided with a plurality of pockets or recesses 27 extending into the end portion from the external end thereof and separated, for example, by radial walls 28.

With regard to joinder of the above-described elements of the spinning bobber of this invention, it is noted that the end portions 16 and 17 are adapted to slip-fit into the large base ends of the conical portions 13 and 14, respectively. Appropriate joinder means such as a glue or resin is utilized at this slip-fit to permanently connect the end portions and conical portions of the body. Additionally, the conical body portions are joined together at their small diameter ends, again by the utilization of an appropriate glue, resin or the like. There may also be provided longitudinally-extended bosses 31 at the small end of each body portion adapted to slip-fit into mating apertures 32 in the opposite body portion to improve structural rigidity of the joinder of these portions of the body.

There has been described above the physical structure of a preferred embodiment of the present invention. This structure generally comprises a central body having a minimum central diameter with axial extensions from the ends thereof and longitudinal pegs or extensions about the circumference of each end and pockets or recesses formed in each end. Additionally, there is provided an axial aperture through the entire bobber for the passage of fishing line.

Considering now utilization of the present invention, the same is adapted to be utilized with a fishing line 41. This line is first threaded through the axial passage or opening in the bobber 11 of this invention. The line is drawn through this opening to an extent substantially equal to the desired depth of a hook 42 adapted to be attached to the end of the line. There is then attached to the line adjacent the end thereof extending through the bobber a small slip-sinker or shot 43, as for example by tying, clamping or the like. The end of the fishline 41 extending beyond the sinker 43 is then joined in conventional manner to a fishhook 42, as by means of a swivel or loop 44. In order to prevent the line from passing further through the bobber from a fishing reel or the like there may be employed, for example, a small piece of woolen yarn 46 which is tied into the line by a knot therein and trimmed enough to allow passage through fishing rod guides and drawn against the top of the passage through the bobber, as shown in FIG. 1. The line depending from the bobber and carrying the sinker and hook is then drawn snugly upwardly from the lower end of the passage through the bobber and passed once about one of the pegs or projections 26 extending longitudinally from the top of the bobber. The line is then drawn downwardly and wound about the center of the bobber at the joinder of the two conical sections, again as illustrated in FIG. 1. After the line has been substantially entirely wound about the center of the bobber it is extended upwardy about a peg or projection 26 and the sinker 43 placed in one of the pockets or depressions 27 in the bobber end 16. The remainder of the line between sink and hook is hung over the side of bobber, again as illustrated in FIG. 1 of the drawing.

Following attachment of a fishing line 41 to the bobber as described above, the line is ready for casting and this operation is carried out in conventional manner. As the line with the hook and sinker at the end thereof is cast to fly through the air and unreel line from a fishing reel or the like the bobber travels along with the hook through the air and ultimately descends on to the surface of the water where the cast is directed. As noted above, the spinning bobber of the present invention is buoyant and consequently floats upon the surface of the water after alighting thereon. With the spinning bobber of the present invention floating upon the water the sinker is initially retained in the end pocket or recess of the bobber in which it has originally been placed. A slight tug on the line by the fisherman casting the line will then tip the bobber so that the sinker or weight 43 falls from this pocket or depression. Sinker 43, being heavier than water, sinks in the water and consequently pulls the fishing line therewith to rotate or spin the bobber in the water until the line is entirely unwound from the bobber and extends only from the lower axial extesion thereof. This position of the present invention is illustrated in FIG. 4 wherein the bobber 11 is shown to be floating or bobbing upon the surface of water and the fishing line 41 is illustrated to depend from the bottom of the bobber with the sinker and hook at a predetermined distance below the surface of the water, as established by the original amount of line wound about the bobber. This then provides for accurate location of the hook beneath the surface of water into which it is cast.

Assuming that the hook is baited and that a fish 51 takes the bait so as to be hooked at the end of the line, it is possible for the angler to then play the fish in the same manner as if there were no float or bobber on the line. The bobber may be readily reeled in just as the line without a bobber may be handled so that netting of a fish caught on the hook is handled in exactly the same manner as if the bobber were not present.

It is to be appreciated that the float or bobber of the present invention is an accessory added to conventional fishing gear and detracting in no way from the normal operation thereof, but instead adding to the capabilities of same. By relatively simple threading through and winding the line about the bobber in the manner described above, the angler is provided with a capability of positively establishing the depth below the top of the water at which the baited hook will dangle. Thus, if it is desired to fish near the bottom of the water or possibly at some predetermined distance below the upper surface thereof it is only required that the line be measured off to the desired depth, knotted about the yarn, and then wound about the bobber in the manner described. Unseating or displacement of the sinker or weight is easily accomplished by a sharp tug on the line to tip over the bobber floating on the surface of the water and drop the sinker into the water so that it sinks and unwinds the line from the bobber. This then materially extends the capabilities of fishing or angling wherein casting with spinning gear is employed, and of course, the invention may also be employed for other applications wherein casting is not required.

Although the present invention has been described above with respect to a single preferred embodiment thereof it is believed evident that various modifications and alterations in the physical structure are possible while yet adhering to the principles of the invention. Consequently reference is made to the appended claims for a definition of the invention.

I claim:

1. A spinning bobber comprising,
   an elongated buoyant body having an opening longitudinally therethrough for the passage of fishing line and a central portion of lesser diameter than adjacent portions about which fishing line is adapted to be wound,
   means defining a plurality of longitudinally-extending projections about the periphery of at least one end of said body for the passage of fishing line thereabout and,
   means defining at least one longitudinal depression in the end of said body having said projections thereabout for receiving a sinker weight on a fish line.

2. A spinning bobber comprising an elongated buoyant body comprising two separate truncated conical portions joined together at the small ends to form a central portion about which fishing line is adapted to be wound and each of said portions having longitudinal projections about the periphery of the large end for the passage of fishing line thereabout and an end wall defining a plurality of separate depressions longitudinally into the body for receiving a sinker weight in any one depression, said body having an opening longitudinally therethrough for the passage of fishing line.

3. The bobber of claim 2 further defined by each of said body portions having at least a partial wall across the small end thereof defining an opening therethrough and a boss extending therefrom whereby said portions mate together with a boss of each in the depression of the other to align said body portions.

4. A spinning bobber comprising,
an elongated buoyant body with a tapered elongated extension extending axially from each end of said body and having an opening longitudinally through said body icluding said extensions for the passage of fishing line and a central portion of lesser diameter than adjacent portions for receiving a fishing line wound about the central portion,
means defining a plurality of longitudinally extending projections about at least one end of said body for the passage of fishing line thereabout, and
means defining at least one longitudinal depression in an end of said body having projections thereabout for receiving a sinker weight on a fishing line.

References Cited
UNITED STATES PATENTS

| | | | |
|---|---|---|---|
| 2,498,815 | 2/1950 | McVay | 43—43.11 |
| 2,536,414 | 1/1951 | Beard | 43—43.11 |
| 2,775,056 | 12/1956 | Sneed | 43—43.11 |
| 3,130,515 | 4/1964 | Graham | 43—43.11 |

SAMUEL KOREN, Primary Examiner

D. J. LEACH, Assistant Examiner

U.S. Cl. X.R.

43—43.15, 44.9